United States Patent
Bartsch

(10) Patent No.: US 10,279,471 B2
(45) Date of Patent: May 7, 2019

(54) TRAVELING SYSTEM WITH CABLE GUIDE

(71) Applicant: SW Automation GmbH, Tettnang (DE)

(72) Inventor: Patrick Bartsch, Meckenbeuren (DE)

(73) Assignee: SW AUTOMATION GMBH, Tettnang (DE)

( * ) Notice: Subject to any disclaimer, the term of this patent is extended or adjusted under 35 U.S.C. 154(b) by 0 days.

(21) Appl. No.: 15/903,122

(22) Filed: Feb. 23, 2018

(65) Prior Publication Data

US 2018/0257220 A1   Sep. 13, 2018

(30) Foreign Application Priority Data

Mar. 8, 2017   (DE) .......................... 10 2017 104 840

(51) Int. Cl.
   *B25J 5/02*   (2006.01)
   *B25J 9/06*   (2006.01)
   *H02G 3/04*   (2006.01)
   (Continued)

(52) U.S. Cl.
   CPC ................. *B25J 9/065* (2013.01); *B25J 5/02* (2013.01); *B25J 19/0025* (2013.01);
   (Continued)

(58) Field of Classification Search
   CPC . B25J 5/02; B25J 5/04; B25J 19/0025; H02G 3/0475; H02G 11/006
   See application file for complete search history.

(56) References Cited

U.S. PATENT DOCUMENTS 7,806,385 B2 * 10/2010 Takeda ................. B25J 19/0025
                                                                         248/326
7,963,188 B2 *  6/2011 Takeda ..................... B25J 9/023
                                                                         74/490.01
(Continued)

FOREIGN PATENT DOCUMENTS

DE           69507102 T2    6/1999
DE       102005027406 A1   12/2006
(Continued)

OTHER PUBLICATIONS

European Search Report in related EP Application No. 18155211.8-1018, dated Jul. 19, 2018.
(Continued)

*Primary Examiner* — Gerald McClain
(74) *Attorney, Agent, or Firm* — Bacon & Thomas, PLLC

(57) ABSTRACT

A traveling system for a handling device with at least one guide element, with at least one carriage body, which is moveable by the guide element in a guided way in at least one plane of movement and on which or upon which at least one handling device can be fixed or is fixed, with at least one drive element by means of which the carriage body is driveable for a movement at least along the guide element, and with at least one cable guide that is connected to the carriage body, which includes a cable guide housing which includes a plurality of housing elements linked to each other, where two adjacent housing elements are movable relative to one another and about a common axis of rotation. At least one cable is also arranged or can be arranged, which is connectible or connected with one end to the handling device.

11 Claims, 4 Drawing Sheets

(51) Int. Cl.
 *B25J 19/00* (2006.01)
 *F16G 13/16* (2006.01)
 *H02G 11/00* (2006.01)
(52) U.S. Cl.
 CPC .......... *B25J 19/0029* (2013.01); *F16G 13/16* (2013.01); *H02G 3/0475* (2013.01); *H02G 11/006* (2013.01)

(56) References Cited

U.S. PATENT DOCUMENTS

| | | | | |
|---|---|---|---|---|
| 8,650,981 | B2* | 2/2014 | Tokumitsu | B25J 5/04 74/490.01 |
| 8,944,481 | B2* | 2/2015 | Collado Jimenez | B25J 15/0061 294/185 |
| 10,016,890 | B2* | 7/2018 | Ochiishi | B25J 19/0025 |
| 2008/0184932 | A1* | 8/2008 | Albrecht | B05B 13/0431 118/500 |
| 2009/0126598 | A1* | 5/2009 | Takeda | B25J 9/026 105/148 |
| 2010/0101360 | A1* | 4/2010 | Tokumitsu | B25J 5/04 74/490.06 |
| 2014/0008928 | A1* | 1/2014 | Collado Jimenez | B25J 15/0061 294/183 |
| 2015/0231781 | A1* | 8/2015 | Ochiishi | B25J 19/0025 414/749.1 |

FOREIGN PATENT DOCUMENTS

| | | | |
|---|---|---|---|
| DE | 10 2008 056 935 A1 | 6/2009 | |
| DE | 20 2010 001 084 U1 | 4/2010 | |
| DE | 10 2012 111 545 A1 | 5/2014 | |
| DE | 10 2015 001 865 A1 | 8/2015 | |
| JP | 2009119566 A * | 6/2009 | .............. B25J 9/026 |
| JP | 2015150675 A * | 8/2015 | .......... B25J 19/0025 |

OTHER PUBLICATIONS

Web Printout of translation from dict.leo.org (https://dict.leo.org/german-english/Antriebselement) (accessed Feb. 1, 2019).

* cited by examiner

TRAVELING SYSTEM WITH CABLE GUIDE

CROSS REFERENCE TO RELATED APPLICATIONS

This application claims priority to Germany application DE 10 2017 104 840.5, filed Mar. 8, 2017, which is incorporated by reference in its entirety.

FIELD OF THE INVENTION

The invention concerns a traveling system for a handling device with at least one guide element, with at least one carriage body, which is moveable by the at least one guide element in a guided way in at least one plane of movement and on which or upon which at least one handling device can be fixed or is fixed, with at least one servo motor by means of which the carriage body is driveable for a movement at least along the guide element, and with at least one cable guide that is connected to the carriage body, which includes a cable guide housing which is comprised of a plurality of housing elements linked to each other in a chain-like manner, of which in each case two adjacent housing elements are movable relative to one another and about a common axis of rotation, in particular are rotatable, and in which at least one cable is arranged or can be arranged, which is connectible or connected with one end to the handling device

BACKGROUND

Such a traveling system is known from DE 10 2015 001 865 A1, in which the common axis of rotation of the housing elements of the cable guide runs parallel to the plane of movement of the carriage body, and the connection of the cable guide to the carriage body and the connection of the cable guide to a power supply are arranged on the same side with respect to the carriage body.

A generic traveling system is known from DE 10 2008 056 935 A1.

In such an arrangement, the cable guide is guided in one direction up to a 180° curve and returned in the opposite direction after the 180° curve. The housing elements after the 180° curve lie on the housing elements running in the direction of the 180° curve.

In this arrangement, it has proven to be disadvantageous that the cable guide forms a bulge, at least in the region of the 180° curve, which can hinder the handling device in its movement.

In addition, with such an arrangement of the cable guide, the individual housing elements are arranged in such a way that their respective open sides are directed upward, whereby contamination can reach the interior of the cable guide.

SUMMARY OF THE INVENTION

One object of an illustrative embodiment of the invention is to propose a traveling system in which the range of motion of the handling device is extended and in which the risk of contamination of the cable guide is reduced.

This object is achieved in a traveling system mentioned above in accordance with the invention in that the cable guide and/or the at least one cable arranged in the cable guide housing is arranged running at least in sections on a first side of the carriage body parallel to the direction of movement of the carriage body and if the cable guide and/or the at least one cable arranged in the cable guide housing is connected or connectible with the carriage body or with the handling device on a side of the carriage body facing away from the first side, in particular on an opposite second side.

Because the axes of rotation of the housing elements of the cable guide are essentially perpendicular or transverse to the plane of movement of the carriage body, the cable guide is always arranged in a plane parallel or transverse to the planes of movement, without the cable guides piling on top of each other in a bulging fashion in a region perpendicular to the plane of movement. As a result of this, the risk of obstruction of the handling device by the cable guide is reduced and the freedom of movement of the handling device is increased.

The housing elements include closed walls transverse to the rotation axis direction. The arrangement of the cable guide in accordance with the invention additionally reduces the risk of penetration of contamination into the cable guide perpendicular to the plane of movement.

The traveling system may include an assembly of a workpiece-processing system, in which the handling device can supply one or more tool machines with workpieces and or tools, for example via at least one loading and unloading aperture.

The handling device can be designed with three, four, five, six or multiple axes or can have a kinematic axis that implements the appropriate degrees of freedom. Moreover, the handling device may include a manipulator, a robot or the like.

In each case, two adjacent housing elements can be joined together via one respective axis of rotation. In addition, the individual housing elements can be joined together by a kinematic axis, in particular without a rotating axis.

In this case, a space-saving arrangement of the cable guide is ensured. Here, the cable guide runs on the first side of the carriage body parallel to the direction of movement and traverses the guide element in a 180° curve about the common axis of rotation in order to run on the second side of the carriage body again parallel to the direction of movement in the direction of the carriage body.

In one embodiment of the traveling system, it proves to be advantageous if the cable guide and/or the at least one cable arranged in the cable guide housing on the first side of the carriage body is attached to a fixed connecting element arranged on the guide element, by means of which the cable can be coupled to a power supply.

The cable can be supplied with power by means of the connecting element attached to the guide element. In this case, it is fundamentally conceivable that electrical power is traveling via the cable from the connecting element to the carriage body and/or the handling device and/or drive means arranged on or upon the connecting element. Moreover, it is also conceivable that in addition to the cable or instead of the cable, a hose or a flexibly bendable tube is arranged in the cable guide via which the carriage body, the handling device, and/or the drive are hydraulically and/or pneumatically driven.

It proves to be advantageous if at least one of the housing elements has at least one housing wall essentially parallel to the plane of movement, which includes, on the side facing away from the cable, a contoured, in particular wavy or knob-like, surface structure with which the housing element rests on the guide element and/or support element.

Due to the fact that the housing wall running parallel to the plane of movement includes a wavy or knob-like surface structure, the friction between the cable guide and the guide element or the suspension element is reduced. In addition, the contoured surface structure reduces the abrasion of the cable guide, as a result of which the traveling system requires little maintenance.

In order to further reduce the risk of contamination of the cable guide, it proves to be advantageous if the traveling system has at least one protective body arranged on the first side of the guide element and/or on the second side of the guide element, which is essentially parallel to the direction of movement in which the cable guide is arranged or can be arranged in sections and that overhangs the cable guide at least in the direction parallel or transverse to the plane of movement.

In a development of the latter embodiment, it proves to be advantageous if the protective body includes an open U-shaped cross section which is open on the side facing the guide element and/or if the protective body includes a bent sheet metal part. In such a case, the protective body is simple and inexpensive to implement.

Furthermore, the protective body may include the support body on or upon which the cable guide rests.

In addition, it proves to be advantageous if the traveling system includes at least one protective plate arranged on the carriage body, which is extended in the direction of the common axis of rotation of the housing elements of the cable guide and which overhangs the cable guide at least in sections.

By providing a protective plate on the carriage body, the area of the cable guide, which crosses the first side of the carriage body with a 180° arc in which the cable guide crosses the guide element in order to run on the second side of the carriage body, is covered when the carriage body includes a distance from the 180° curve of the cable guide, which is less than the length of the protective plate. As a result, the protective plate shields the cable guide against contamination when the carriage body and the handling device arranged on the carriage body are arranged in the vicinity of the 180° curve of the cable guide. In this case, the risk of contamination of the cable guide can be further reduced.

In addition, the traveling system may include at least one support, on which the at least one guide element, the support element, the protective body and/or the cable guide is/are arranged or can be arranged, which is fixed to the ground, in particular steplessly or at ground level, or spaced by at least one support from the ground.

The support element may be formed by the supporter.

The guide element can in principle be of any desired design, as long as it fulfills the function of guiding the carriage body in its movement. The guide element can be easily formed if the guide element includes at least one rail extended in the direction of movement, on which the carriage body is slideable in the direction of movement.

Furthermore, the guide element may include two parallel rails.

BRIEF DESCRIPTION OF THE DRAWINGS

Further features, details and advantages of the invention will become apparent from the appended patent claims, the drawings and the following description of preferred embodiments of the traveling system.

The drawing shows the following.

DETAILED DESCRIPTION OF THE INVENTION

Figure 1:
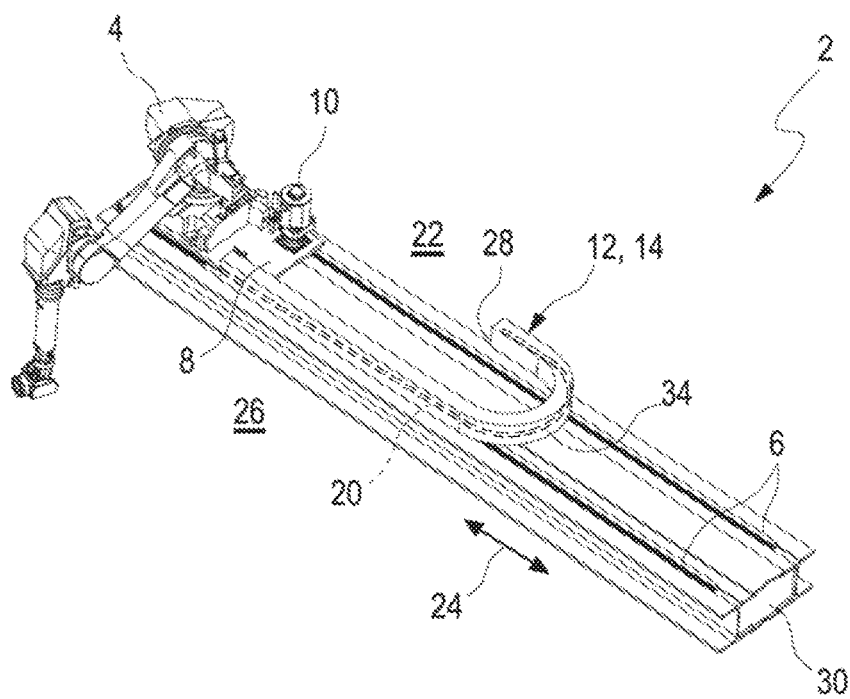
FIG. 1 is a side perspective view of a first embodiment of the traveling system.

FIGS. 1 to 5 show a traveling system designated overall with the reference number 2. The traveling system 2 is suitable for travelinging a handling device 4. For this purpose, the traveling system 2 includes a guide element 6 and a carriage body 8, which is guided by the guide element 6 in at least one plane of movement. The handling device 4 is attached to the carriage body 8. In addition, the traveling system 2 includes a servo motor 10, by means of which the carriage body 8 can be driven for movement along at least the guide element 6.

Further, the traveling system 2 includes a cable guide 12 which is connected to the carriage body 8 and which includes a cable guide housing 14 which is formed of a plurality of chain link-like housing elements 16 (shown in FIGS. 6, 7a and 7b), of which two adjacent housing elements 16 are rotatable relative to each other about a respective axis of rotation 18 located between the two adjacent housing elements 16. At least one cable 20 can be arranged in the cable guide 12, or in the cable guide housing 14 of the cable guide 12, which is connected or can be connected at one end to the handling device 4 (hidden in the figures by the cable guide housing 14).

Figure 6:
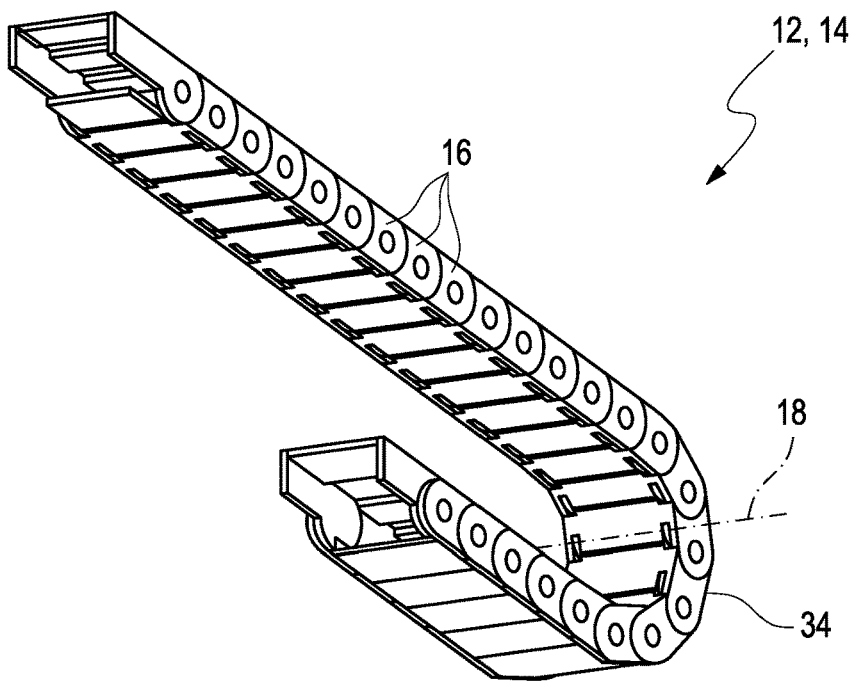
FIG. 6 is a side perspective view of a cable guide.

In particular, in FIG. 6 it can be seen that the axis of rotation 18 of the housing elements 16 of the cable guide 12 is essentially perpendicular to the plane of movement of the carriage body 8.

FIGS. 1 to 5 show embodiments in which the cable guide 12 is arranged at least partially on a first side 22 of the carriage body 8 parallel to the direction of movement 24 of the carriage body 8 and is connected with the carriage body 8 or the handling device 4 on a second side 26 of the carriage body which faces away from the first side 22.

The cable guide 12 and the at least one cable 20 arranged in the cable guide housing 14 are attached on the connecting element 28 fixed in place on guide element 6 on the first side of the carriage body 8, whereby the cable 20 is connected with a power supply via the connecting element 28.

FIG. 1 shows a first illustrative embodiment of the traveling system 2, in which the guide element 6, the carriage body 8, and the cable guide 12 are fixed on or upon a supporter 30 which is fixed to a floor, in particular sleeplessly or at ground level.

Figure 2:
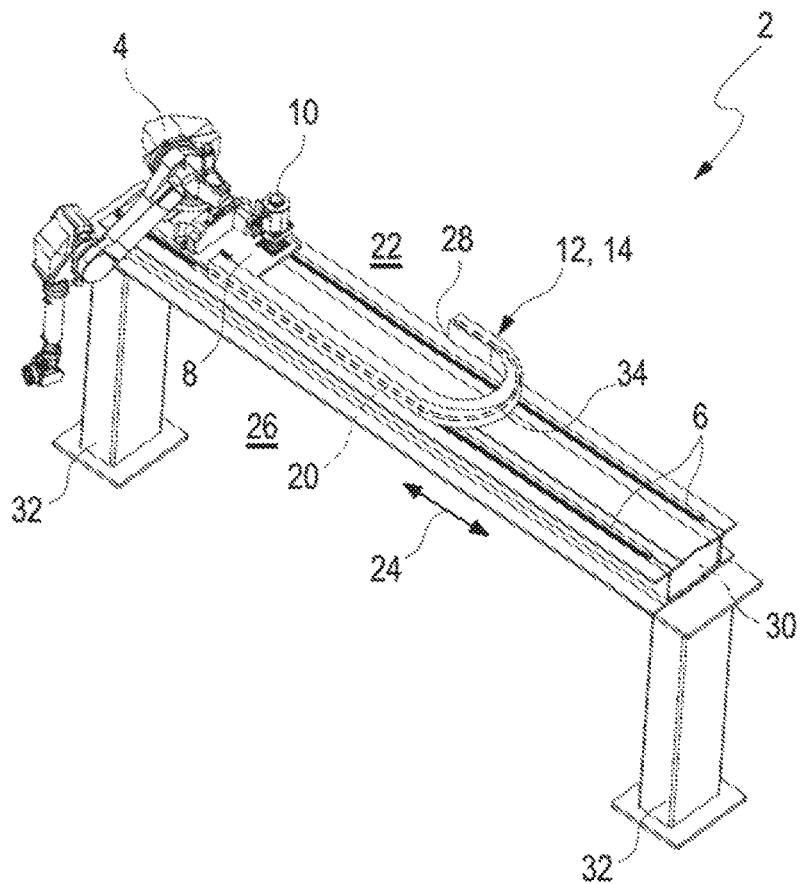
FIG. 2 is a side perspective view of a second embodiment of the traveling system in a first end position.
Figure 3:
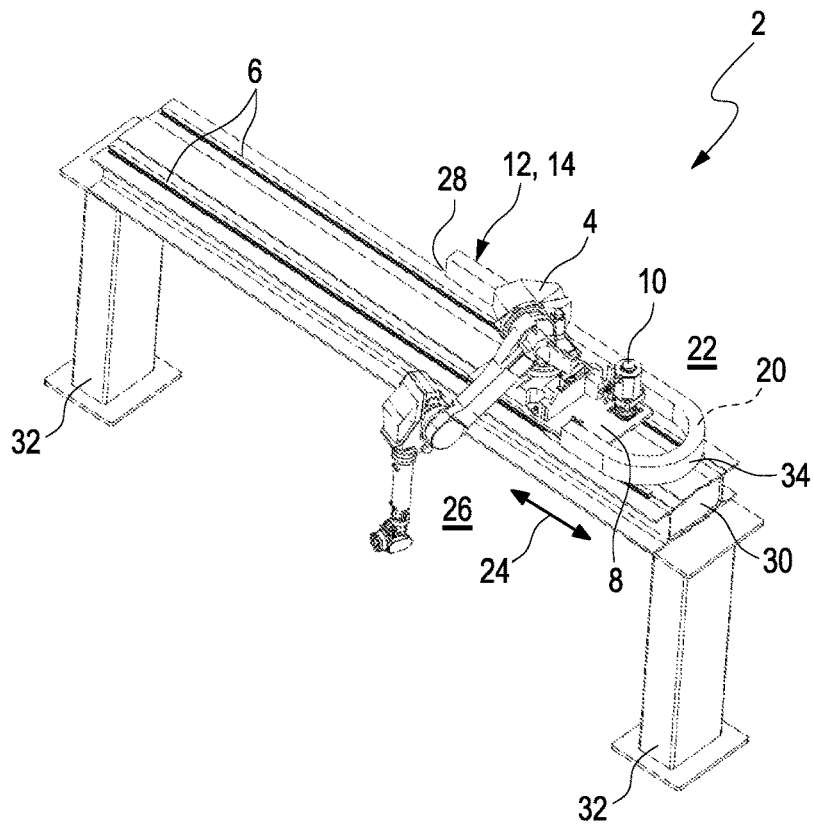
FIG. 3 is a side perspective view of the second embodiment of the traveling system in a second end position.

FIGS. 2 and 3 show a second illustrative embodiment of the traveling system 2, in which the supporter 30 is spaced from the ground by means of two support bodies 32. In this case, tool machines are easier to load from the top with the handling device 4.

FIG. 2 shows the traveling system 2 in a first end position. In this position, the cable guide 12 extends essentially primarily on the second side 26 of the carriage body 8 and the distance between the carriage body 8 to a 180° curve 34 of the cable guide 12 is at a maximum. Accordingly, the extension of the cable guide 12 in this position of the carriage body 8 on the first side 22 of the carriage body 8 is at a minimum.

FIG. 3 shows the traveling system 2 in accordance with FIG. 2 in a second end position. In this position, the distance of the carriage body 8 to 180° curve 34 of the cable guide 12 is at a minimum. The extension of the cable guide 12 on the second side 26 of the carriage body 8 is at a minimum, and the extension of the cable guide 12 on the first side 22 of the carriage body 8 is at a maximum.

Figure 4:
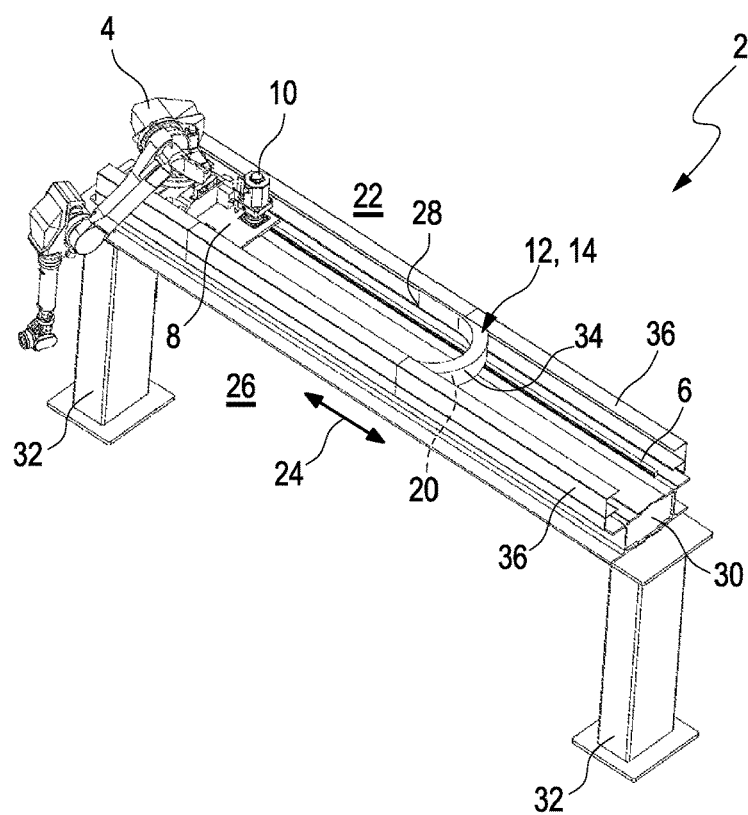
FIG. 4 is a side perspective view of a third embodiment of the traveling system.

FIG. 4 shows a third illustrative embodiment of the traveling system 2, in which a protective body 36 is additionally arranged on the first side 22 and on the second side 26 of the carriage body 8. This essentially includes a U-shaped cross section, in which the cable guide 12 is arranged. The cable guide 12 is thereby covered by the protective body 36 essentially parallel or transverse to the plane of movement.

Figure 5:
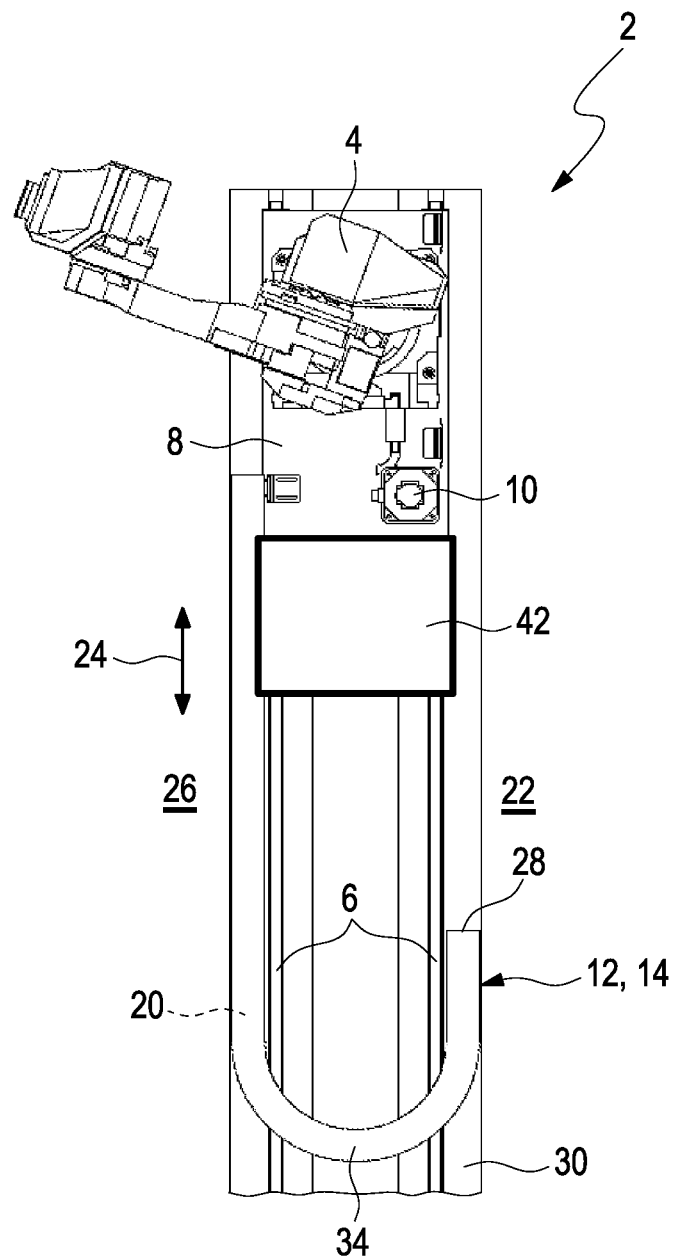
FIG. 5 is a top view of a fourth embodiment of the traveling.

FIG. 5 shows a fourth illustrative embodiment of the traveling system 2, in which an extended protective plate 42 is fixed; the protective plate is arranged on the carriage body 8 and in the direction of the cable guide 12, in particular in the direction of the 180° curve 34. The protective plate 42 overhangs the 180° curve 34 of the cable guide 12 from above when the carriage body 8 is in the second end position in accordance with FIG. 3.

FIG. 6 shows an isolated representation of the cable guide 12. The plurality of housing elements 16 joined in a chain-link like manner can be seen here. The housing elements run on the first side 22 of the carriage body 8 essentially parallel to the direction of movement 24; the same applies to the arrangement of the cable guide 12 on the second side 26 of the carriage body 8. Because the housing elements 16 are each rotatable relative to each other with a common axis of rotation 18, a 180° curve 34 is made possible by the change from the first side 22 of the carriage body 8 to the second side 26 of the carriage body 8 in a plane parallel to the plane of movement. The individual housing elements 16 are at least partially open on the side facing carriage body 8 in order to be able to be moved relative to each other.

Figure 7:
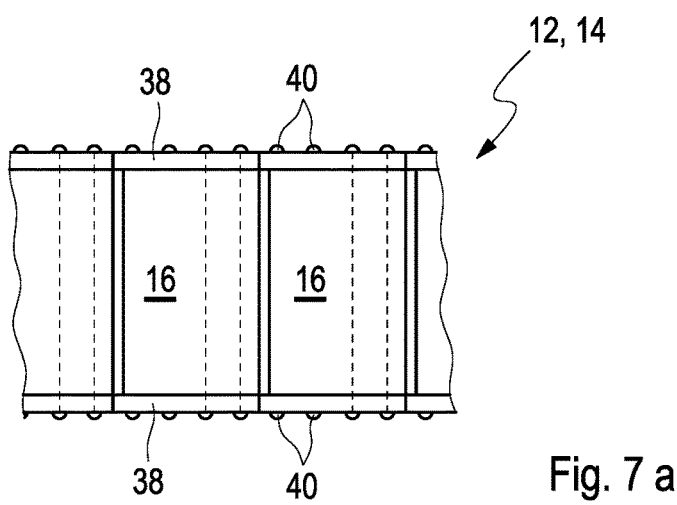
FIG. 7a shows a detailed side view of an area of the cable guide in accordance with FIG. 6.
FIG. 7b shows a top view of an area of the cable guide in accordance with FIG. 6.
Figure 7:
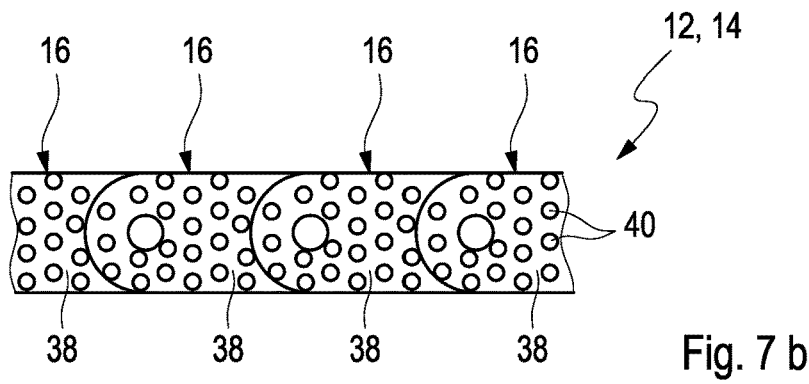

FIGS. 7a and 7b show a side view (FIG. 7a) and a top view (FIG. 7b) of an area of the cable guide 12. The housing elements 16 have on their housing walls 38 contoured surface structures 40, with which the respective housing elements 16 rest on the guide element 6 and/or on a support element, such as the supporter 30 or the protective body 36.

The features of the invention disclosed in the foregoing description, in the claims and in the diagrams, may be essential both individually and in any combination in the implementation of the invention in its various embodiments.

REFERENCE LIST 2 traveling system
4 handling device
6 guide element
8 carriage body
10 servo motor
12 cable guide
14 cable guide housing
16 housing elements
18 rotation axis
20 cable
22 first side of the carriage body
24 direction of movement
26 second side of the carriage body
28 connecting element
30 carrier
32 supporting body
34 180° curve
36 protective body
38 housing wall
40 surface structure
42 protective plate

The invention claimed is:

1. A traveling system (2) for a handling device (4) comprising:
   at least one guide element (6),
   at least one carriage body (8), which is configured to be moved by the at least one guide element (6) in a guided way in at least one plane of movement and on which or upon which at least one handling device (4) is configured to be fixed or is fixed, with a servo motor (10) by means of which the at least one carriage body (8) is configured to be driven for a movement at least along the at least one guide element (6), and with at least one cable guide (12) that is connected to the at least one carriage body (8), which includes a cable guide housing (14) which is comprised of a plurality of housing elements (16) linked to each other, of which in each case two adjacent housing elements (16) are configured to be moved relative to one another and about a common axis of rotation or are configured to be rotated, and in which at least one cable (20) is arranged, which is configured to be connected with one end to the at least one handling device (4),
   wherein the common axis of rotation of the housing elements (16) of the at least one cable guide (12) is perpendicular or transverse to the plane of movement of the at least one carriage body,
   wherein the cable guide (12) and/or the at least one cable (20) arranged in the cable guide housing (14) is arranged running at least in sections on a first side (22) of the at least one carriage body (8) parallel to the direction of movement of the at least one carriage body (8) and wherein the cable guide (12) and/or the at least one cable (20) arranged in the cable guide housing (14) is configured to be connected with the at least one carriage body (8) or with the at least one handling device (4) on a side of the at least one carriage body (8) facing away from the first side (22) and on an opposite second side (26), and
   wherein the cable guide (12) is arranged outside outer planes formed from planes tangential to the at least one carriage body (8) that are parallel to the plane of movement of the at least one carriage body (8),
   wherein the at least one handling device (4) is a manipulator or robot.

2. The traveling system (2) in accordance with claim 1, wherein the cable guide (12) and/or the at least one cable (20) arranged in the cable guide housing (14) on the first side (22) of the at least one carriage body (8) is attached to a fixed connecting element (28) arranged on the at least one guide element (6), by means of which the cable (2) is configured to be coupled to a power supply.

3. The traveling system (2) in accordance with claim 2, wherein at least one of the plurality of housing elements (16) has at least one housing wall (38) essentially parallel to the plane of movement, which includes, on the side facing away from the at least one cable (20), a contoured surface structure (40) with which the housing element (16) rests on the guide element (6) and/or support element.

4. The traveling system in accordance with claim 2, further comprising at least one protective body arranged on a first side of the at least one guide element and/or on a second side of the guide element, which is essentially parallel to the direction of movement in which the at least one cable guide is arranged in sections and overhangs the at least one cable guide at least in the direction parallel or transverse to the plane of movement.

5. The traveling system in accordance with claim 1, further comprising at least one protective body arranged on a first side of the at least one guide element and/or on a second side of the guide element, which is essentially parallel to the direction of movement in which the at least one cable guide is arranged in sections and overhangs the at least one cable guide at least in the direction parallel or transverse to the plane of movement.

6. The traveling system in accordance with claim 5, wherein the at least one protective body includes an open U-shaped cross section which is open on a side facing the at least one guide element and/or the at least one protective body includes a bent sheet metal part.

7. The traveling system in accordance with claim 1, further comprising at least one protective plate arranged on the at least one carriage body, which is extended in the direction of the common axis of rotation of the plurality of housing elements of the cable guide and which overhangs the cable guide at least in sections.

8. The traveling system in accordance with claim 1, further comprising at least one support, on which at least one of the at least one guide element, a support element, a protective body and the cable guide is/are arranged, which is fixed to the ground, in particular steplessly or at ground level, or spaced by at least one support from the ground.

9. The traveling system (2) in accordance with claim 1, wherein the at least one guide element (6) comprises at least one rail extended in the direction of movement (24) on which the at least one carriage body (8) is configured to slide in the direction of movement.

10. The traveling system (2) in accordance with claim 1, wherein at least one of the plurality of housing elements (16) has at least one housing wall (38) essentially parallel to the plane of movement, which includes, on the side facing away from the at least one cable (20), a contoured surface structure (40) with which the housing element (16) rests on the guide element (6) and/or support element.

11. The traveling system (2) in accordance to claim 1, wherein the plurality of housing elements (16) include closed walls transverse to the common axis of rotation.

* * * * *